United States Patent
Betz, II et al.

(10) Patent No.: US 7,467,550 B2
(45) Date of Patent: Dec. 23, 2008

(54) FUEL TANK FLOAT ARM ASSEMBLY

(75) Inventors: Gerard G. Betz, II, Pleasant Ridge, MI (US); Donald R. Begin, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 395 days.

(21) Appl. No.: 11/422,621

(22) Filed: Jun. 7, 2006

(65) Prior Publication Data

US 2007/0283755 A1    Dec. 13, 2007

(51) Int. Cl.
    *G01F 23/00*    (2006.01)
(52) U.S. Cl. .......................................... 73/313; 73/317
(58) Field of Classification Search .................. 73/313, 73/317, 311
    See application file for complete search history.

(56) References Cited

U.S. PATENT DOCUMENTS

| | | | | |
|---|---|---|---|---|
| 4,870,861 | A * | 10/1989 | Ohtani et al. | 73/317 |
| 5,341,679 | A * | 8/1994 | Walkowski et al. | 73/317 |
| 6,326,895 | B1 * | 12/2001 | Hartke et al. | 340/612 |
| 6,658,934 | B1 * | 12/2003 | Housey et al. | 73/317 |
| 6,711,950 | B1 * | 3/2004 | Yamaura et al. | 73/317 |
| 2005/0103103 | A1 * | 5/2005 | Newman et al. | 73/313 |

* cited by examiner

*Primary Examiner*—Hezron Williams
*Assistant Examiner*—Rodney T Frank

(57) ABSTRACT

The invention concerns a float arm assembly for use in a vehicle fuel tank and a method of operating the float arm assembly to determine a level of fuel in the tank. First and second resistor cards are electrically connected in series and each includes a pivoting float arm with a float attached to an end. The first and second resistor cards, with separate floats allow the fuel level to be more accurately determined, especially in fuel tanks with complex contours and indentations in the tank wall that create dead bands in a single float type of arrangement.

20 Claims, 1 Drawing Sheet

FUEL TANK FLOAT ARM ASSEMBLY

BACKGROUND OF INVENTION

The present invention relates to a float arm assembly used for measuring the liquid level in a fuel tank, and in particular to a float arm assembly in a vehicle fuel tank.

A typical float arm assembly used in a vehicle fuel tank includes a fixed support to which a ceramic resistor card is mounted. A float is pivotally mounted to the resistor card by a float arm. As the fuel level in the tank goes up and down, the buoyancy of the float causes it to move up and down with the level of fuel, thus changing the angle of the float arm relative to the resistor card. This change in angle causes a change in output from the resistor card, which is typically received and processed by a powertrain control module and displayed on the fuel gauge.

In modern automotive vehicles, the desire to maximize the capacity of a fuel tank may require the fuel tank to have a greatly contoured shape. This may even include significant indentations in the fuel tank wall in order to avoid adjacent vehicle structure and components. The contoured shape—in combination with the indentations—may limit the amount of pivoting of the float and float arm that can occur without creating interference problems between the float arm assembly and the fuel tank wall. Consequently, the float and float arm may not be able to pivot all the way up to a full liquid level and/or all the way down to an empty liquid level. Such limitations in the travel of the float arm and float, then, create a dead band, which is the unreadable but useful fuel in the fuel tank. This dead band is undesirable because it limits the accuracy of the fuel gauge reading, which may reduce customer satisfaction with the vehicle and possibly even increase warranty costs.

Attempts to minimize the dead band have included fuel tanks with two separate float arm assemblies, each mounted and operating separately. While this may reduce dead band concerns, it adds an additional sender opening for communicating the additional fuel level signal to the powertrain control module. This multiple float arm assembly, then, requires the powertrain control module to receive and process a second, separate fuel level signal, adds additional cost for fabricating and assembling an entire separate float arm assembly and cover for the second sender opening, and increases the potential for permeation out of the tank.

SUMMARY OF INVENTION

An embodiment of the present invention contemplates a float arm assembly for a vehicle fuel tank. The float arm assembly comprises a first float support mountable in the fuel tank, a second float support mountable in the fuel tank, a first resistor card mounted to the first float support, a second resistor card mounted to the second float support, spaced from the first resistor card and electrically connected in series with the first resistor card, a first float arm pivotally connected to the first resistor card and extending therefrom, a second float arm pivotally connected to the second resistor card and extending therefrom, a first float fixed to the first float arm, and a second float fixed to the second float arm.

An embodiment of the present invention contemplates a float arm assembly for a vehicle fuel tank comprising: at least one float support mountable in the fuel tank; a first resistor card mounted to the at least one float support; a second resistor card mounted to the at least one float support, spaced from the first resistor card and electrically connected in series with the first resistor card; a first float arm pivotally connected to the first resistor card and extending therefrom; a second float arm pivotally connected to the second resistor card and extending therefrom; a first float fixed to the first float arm; and a second float fixed to the second float arm.

An embodiment of the present invention contemplates a method of detecting a level of a fuel in a vehicle fuel tank having a float arm assembly, the method comprising the steps of: connecting a first resistor card in electrical series connection with a second resistor card that is spaced from the first resistor card; allowing a first float, having a density less than the fuel, to pivot on a first float arm relative to the first resistor card due to the buoyancy of the first float in the fuel; allowing a second float, having a density less than the fuel, to pivot on a second float arm relative to the second resistor card due to the buoyancy of the second float in the fuel; and communicating a signal indicative of a position of the first float arm relative to the first resistor card and a position of the second float arm relative to the second resistor card to a powertrain control module.

An advantage of an embodiment of the present invention is that the dead band is greatly reduced or even eliminated, even with tanks having complex contours and intrusive indentations. Thus, a more accurate fuel gauge reading over the entire fill level of the tank is provided.

An advantage of an embodiment of the present invention is that only one fuel level signal needs to be communicated from the tank to the powertrain control module, even though two float arms and floats are employed. Moreover, with resistor cards connected in series, this communicated signal can be the same as with a tank having a single float arm and float.

An additional advantage of an embodiment of the present invention is that the more accurate fuel level reading is obtained without the need to add an additional float arm assembly, fuel sender hole and cover to the fuel tank. Thus, increase potential for permeation is avoided, and additional parts and assembly time are minimized.

DETAILED DESCRIPTION

Figure 1:
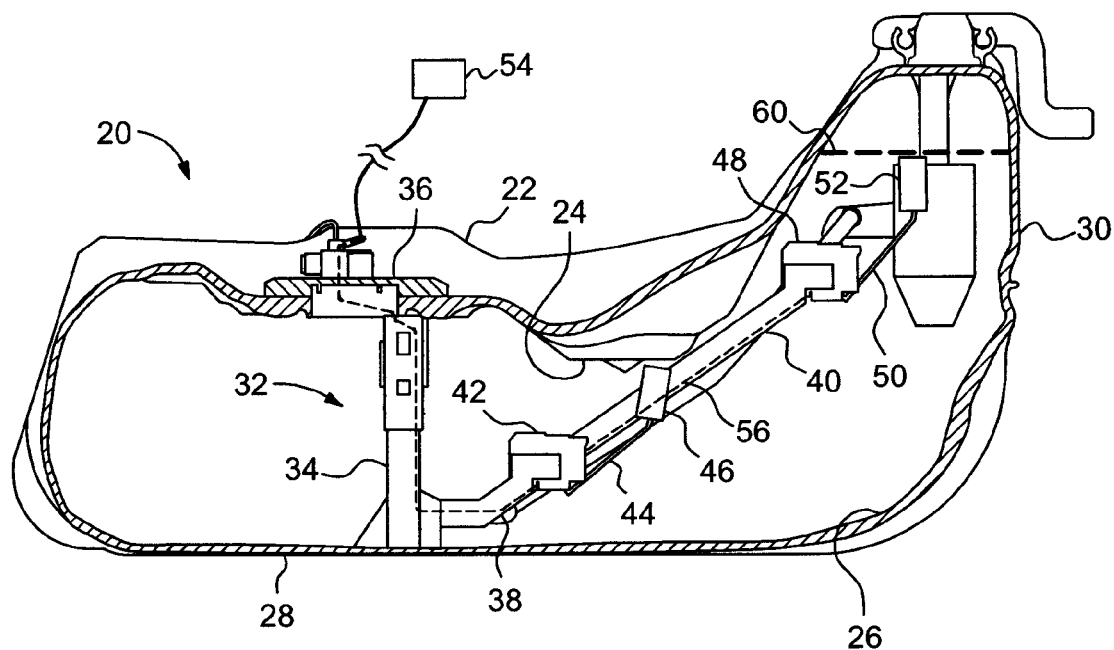
FIG. 1 is a somewhat schematic, partial section view of a portion of a fuel tank assembly, with floats shown in a full fuel tank position, in accordance with the present invention.
Figure 2:
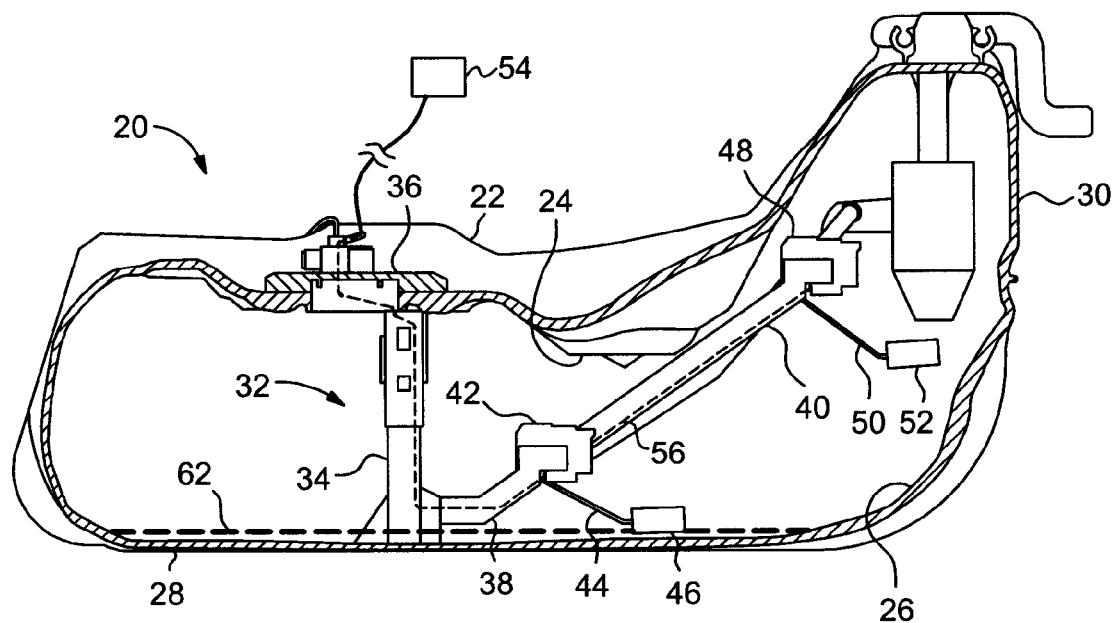
FIG. 2 is a view similar to FIG. 1, but with the floats shown in an empty fuel tank position.

FIGS. 1-2 illustrate a fuel tank assembly, indicated generally at 20, for a vehicle (not shown). The fuel tank assembly 20 includes a tank 22 (i.e., the tank wall and covers for openings in the tank walls), which has a complex shape needed to maximize the fuel capacity while fitting around/between various vehicle components. For example, the tank 22 includes a seat belt anchor indentation 24, which is needed for the tank 22 to avoid interfering with a seat belt anchor (not shown). Also, for example, the tank 22 has a rear suspension indentation 26 that allows the tank 22 to avoid interfering with the vehicle rear suspension (not shown). The tank 22 has an overall shape with a shorter horizontally extending portion 28 and a taller vertically extending portion 30. Again, the shape is dictated to a great extent by the need to fit around vehicle structure and components (not shown). The examples just discussed are some of many examples of overall shapes and indentations that may be needed in order to allow for maximum capacity of a fuel tank while avoiding vehicle structure and components.

The fuel tank assembly 20 includes a float arm assembly 32 mounted therein, having a main support 34 that extends generally vertically and is connected to a cover 36, which is mounted on and sealed to the top of the tank 22 (over a sender opening). The float arm assembly 32 also includes a first float support 38, extending from the main support 34, and a second float support 40, which may extend from the main support 34 or the first float support 38. While the first float support 38 and second float support 40 may be separate components, they also may be an integral part with two separate resistor cards mounted spaced apart if the shape of the tank 22 for the particular vehicle allows for such a configuration. Preferably, the first float support 38 and the second float support 40 are mounted on the same main support 34 so they move up and down by the same amounts as the floor of the tank 22 flexes due to pressure fluctuations in the fuel tank 22. This mounting configuration, then, minimizes inaccuracies that can be introduced in fuel level readings.

The first float support 38 includes a first ceramic resistor card 42 mounted to its end opposite the main support 34. A first float arm 44 extends from and pivots relative to the first ceramic resistor card 42. A first float 46 extends from a free end of the first float arm 44. The second float support 40 includes a second ceramic resistor card 48 mounted to its end opposite the main support 34. A second float arm 50 extends from and pivots relative to the second ceramic resistor card 48. A second float 52 extends from a free end of the second float arm 50.

The float supports 38, 40 and resistor cards 42, 48 remain fixed in their positions in the tank 22 as the vehicle is operated. The floats 46, 52 have a density less than the fuel in the tank 22 and so their buoyancy will cause them to float up and down with the changing fuel level in the tank 22. As the floats 46, 52 float up and down with the changing fuel level in the tank 22, they will cause the float arms 44, 52 to pivot relative to their respective ceramic resistor cards 42, 48. The pivoting causes the resistance output of the particular resistor card 42, 48 to vary, based on the angle of its float arm 44, 50.

The second float support 40 extends outward and upward farther from the main support 34 than the first float support 38. The length and angle of extension of the second float support 40 locates the second ceramic resistor card 48 such that it will allow the second float 52 to freely pivot from at or near the highest level the fuel reaches for a full tank (indicated by dashed line 60 in FIG. 1) to a level where the tank 22 is only partially filled with fuel. In the particular example of this embodiment, the second float 52 is allowed to pivot down to a level that is below that of the seat belt anchor indentation 24. Consequently, neither the seat belt anchor indentation 24 nor the rear suspension indentation 26 restrict or inhibit the desired range of motion for the second float 52.

The length and angle of extension of the first float support 38 locates the first ceramic resistor 42 such that it will allow the first float 46 to freely pivot from near the seat belt anchor indentation 24 to a level where the tank 22 is almost completely empty of fuel (indicated by dashed line 62 in FIG. 2). Neither the seat belt anchor indentation 24 nor the rear suspension indentation 26 restrict or inhibit the desired range of motion for the first float 46.

Ideally, the overlap between the lowest level to which the second float 52 extends and the highest level to which the first float 46 extends is zero. Thus, as the fuel tank 22 empties, the second float 52 would stop as the first float 46 begins to drop. But due to manufacturing tolerances, there may be a small designed-in overlap zone, which is preferably minimized based on manufacturing capability for the particular fuel tank assembly 20.

The first and second ceramic resistor cards 42, 48 are preferably wired in series (indicated schematically by dashed line 56), and in communication with a powertrain control module 54. Thus, the powertrain control module 54 can receive a single signal from this fuel tank assembly 20 relating to the level of fuel in the tank 22. Also, preferably (but not required), the two resistor cards 42, 48 have a total resistance equal to the resistance of a tank having a single float. In this way, the powertrain control module 54 can be used for a one float or a two float configuration. With the resistor cards 42, 48 wired in series, the overlap zone will provide a slight non-linearity in the signal from the resistor cards 42, 48 when the fuel level is in the overlap zone. But with the approximate amount of overlap known, the non-linearity of the signal in this zone is accounted for in the calibration of the powertrain control module 54.

FIG. 1 illustrates the positions of the floats 46, 52 when the level of fuel 60 in the fuel tank 22 is at its highest. Both floats 46, 52 are at their highest levels, so, with the resistor cards 42, 48 connected in series, the total resistance is the sum of that from the two cards 42, 48—this resistance indicating a full tank 22. FIG. 2 illustrates the positions of the floats 46, 52 when the level of fuel 62 in the fuel tank 22 is at its lowest. Both floats 46, 52 are at their lowest levels. Again, the total resistance is the sum of that from the two cards 42, 48—this resistance indicating an empty tank. Between full and partially empty, the second float 52 will drop with the fuel level, while the first float 46 remains stationary, so the change in resistance of the second resistor card 48 will indicate a drop in fuel level.

Since the second float 52 extends essentially up to the full level 60 and the first float 46 extends essentially down to the empty level 62, the amount of fuel in the tank 22 over the full range can be accurately determined. This is true even though the contours and indentations in the particular tank would otherwise prevent an accurate measurement from a float arm assembly with only a single float. Moreover, two separate float arm assemblies, with the extra hardware and multiple signals sent to the powertrain control module, are not required to obtain an accurate fuel level reading.

While only two resistor cards connected in series (with respective float arms and floats) are shown in this embodiment, the float arm assembly can have three or more cards connected in series (and corresponding float arms and floats) if needed to obtain accurate fuel level readings for particularly complicated shapes of fuel tanks. Also, for vehicles having saddle tanks, each of the saddle tanks can have multiple resistor cards if so desired, with the resistor cards in each respective tank connected in series.

While certain embodiments of the present invention have been described in detail, those familiar with the art to which this invention relates will recognize various alternative designs and embodiments for practicing the invention as defined by the following claims.

What is claimed is:

1. A float arm assembly for a vehicle fuel tank comprising:
   a first float support mountable in the fuel tank;
   a second float support mountable in the fuel tank;
   a first resistor card mounted to the first float support;
   a second resistor card mounted to the second float support, spaced from the first resistor card and electrically connected in series with the first resistor card;
   a first float arm pivotally connected to the first resistor card and extending therefrom;
   a second float arm pivotally connected to the second resistor card and extending therefrom;

a first float fixed to the first float arm; and a second float fixed to the second float arm.

2. The assembly of claim 1 including a main support supporting the first float support and the second float support in the fuel tank.

3. The assembly of claim 1 including a main support supporting the first float support, and the first float support supporting the second float support.

4. The assembly of claim 1 wherein the second float arm is pivotable relative to the second resistor card to an extent that allows the second float to extend upward adjacent to a full fuel level and downward partially toward an empty fuel level.

5. The assembly of claim 4 wherein the first float arm is pivotable relative to the first resistor card to an extent that allows the first float to extend downward adjacent to the empty fuel level and upward partially toward the full fuel level.

6. The assembly of claim 5 wherein the downward pivot of the second float arm allows the second float to be at the same level as the first float when the first float arm is pivoted upward.

7. The assembly of claim 1 including a powertrain control module wherein one of the first resistor card and the second resistor card is in communication with the powertrain control module with a signal indicative of a sum of resistances of the first resistor card and the second resistor card.

8. A float arm assembly for a vehicle fuel tank comprising:

at least one float support mountable in the fuel tank;

a first resistor card mounted to the at least one float support;

a second resistor card mounted to the at least one float support, spaced from the first resistor card and electrically connected in series with the first resistor card;

a first float arm pivotally connected to the first resistor card and extending therefrom;

a second float arm pivotally connected to the second resistor card and extending therefrom;

a first float fixed to the first float arm; and a second float fixed to the second float arm.

9. The assembly of claim 8 including a main support supporting the at least one float support in the fuel tank.

10. The assembly of claim 8 wherein the second float arm is pivotable relative to the second resistor card to an extent that allows the second float to extend upward adjacent to a full fuel level and downward partially toward an empty fuel level.

11. The assembly of claim 10 wherein the first float arm is pivotable relative to the first resistor card to an extent that allows the first float to extend downward adjacent to the empty fuel level and upward partially toward the full fuel level.

12. The assembly of claim 8 wherein the first float arm is pivotable relative to the first resistor card to an extent that allows the first float to extend downward adjacent to the empty fuel level and upward partially toward the full fuel level.

13. The assembly of claim 8 including a powertrain control module wherein one of the first resistor card and the second resistor card is in communication with the powertrain control module with a signal indicative of a sum of resistances of the first resistor card and the second resistor card.

14. A method of detecting a level of a fuel in a vehicle fuel tank having a float arm assembly, the method comprising the steps of:

(a) connecting a first resistor card in electrical series connection with a second resistor card that is spaced from the first resistor card;

(b) allowing a first float, having a density less than the fuel, to pivot on a first float arm relative to the first resistor card due to the buoyancy of the first float in the fuel;

(c) allowing a second float, having a density less than the fuel, to pivot on a second float arm relative to the second resistor card due to the buoyancy of the second float in the fuel; and (d) communicating a signal indicative of a position of the first float arm relative to the first resistor card and a position of the second float arm relative to the second resistor card to a powertrain control module.

15. The method of claim 14 wherein step (d) is further defined by the signal being a sum of resistances of the first resistor card and the second resistor card.

16. The method of claim 15 wherein step (b) is further defined by the first float arm being pivotable relative to the first resistor card to an extent that allows the first float to extend downward adjacent to an empty fuel level and upward partially toward a full fuel level.

17. The method of claim 16 wherein step (c) is further defined by the second float arm being pivotable relative to the second resistor card to an extent that allows the second float to extend upward adjacent to the full fuel level and downward partially toward the empty fuel level.

18. The method of claim 14 wherein step (b) is further defined by the first float arm being pivotable relative to the first resistor card to an extent that allows the first float to extend downward adjacent to an empty fuel level and upward partially toward a full fuel level.

19. The method of claim 18 wherein step (c) is further defined by the second float arm being pivotable relative to the second resistor card to an extent that allows the second float to extend upward adjacent to the full fuel level and downward partially toward the empty fuel level.

20. The method of claim 19 wherein steps (b) and (c) are further defined by the downward pivot of the second float arm allowing the second float to be at the same level as the first float when the first float arm is pivoted upward.

* * * * *